United States Patent
Sambhwani et al.

(10) Patent No.: US 8,428,077 B2
(45) Date of Patent: Apr. 23, 2013

(54) METHODS AND APPARATUS FOR DYNAMIC LOAD BALANCING WITH E-AICH

(75) Inventors: Sharad Sambhwani, San Diego, CA (US); Aziz Gholmieh, San Diego, CA (US); Bibhu P. Mohanty, San Diego, CA (US); Danlu Zhang, San Diego, CA (US); Mehmet Yavuz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 128 days.

(21) Appl. No.: 12/404,615

(22) Filed: Mar. 16, 2009

(65) Prior Publication Data

US 2009/0274048 A1 Nov. 5, 2009

Related U.S. Application Data

(60) Provisional application No. 61/041,059, filed on Mar. 31, 2008.

(51) Int. Cl.
*H04J 3/16* (2006.01)

(52) U.S. Cl.
USPC ........................................................ 370/437

(58) Field of Classification Search ............ 370/330, 370/437, 332; 455/450, 62, 522, 67.11, 63.1, 455/454
See application file for complete search history.

(56) References Cited

U.S. PATENT DOCUMENTS

| | | | |
|---|---|---|---|
| 6,643,318 B1 | 11/2003 | Parsa et al. | |
| 6,804,214 B1 * | 10/2004 | Lundh et al. | 370/335 |
| 7,200,153 B2 | 4/2007 | Feuerstraeter et al. | |
| 7,558,208 B2 | 7/2009 | Lin et al. | |
| 7,680,156 B2 * | 3/2010 | Jung et al. | 370/522 |
| 2007/0147310 A1 | 6/2007 | Cai | |
| 2009/0135940 A1 * | 5/2009 | Imamura | 375/267 |
| 2010/0075689 A1 * | 3/2010 | Uemura et al. | 455/452.1 |

FOREIGN PATENT DOCUMENTS

| | | |
|---|---|---|
| CN | 1357212 A | 7/2002 |
| EP | 1489876 A1 | 12/2004 |
| EP | 1677564 A1 | 7/2006 |
| EP | 1903816 A1 | 3/2008 |
| JP | 10200474 A | 7/1998 |

(Continued)

OTHER PUBLICATIONS

International Search Report and Written Opinion—PCT/US2009/038765, International Search Authority—European Patent Office—Jul. 20, 2009.

(Continued)

*Primary Examiner* — Chandrahas Patel
(74) *Attorney, Agent, or Firm* — Charles Chesney

(57) ABSTRACT

Systems and methodologies are described that facilitate dynamic load balancing in a communications network. In particular, one or more mobile devices can send random access preambles on an uplink frequency paired to a downlink frequency employed to connect the one or more mobile devices to a base station. The base station can determine if an uplink frequency load imbalance exists based upon the random access preambles. The base station can transmit an indicator on an acquisition indicator channel to at least one mobile device wherein the indicator includes a command to transition to a new uplink frequency. The mobile device can switch uplink frequencies in response to the command.

36 Claims, 10 Drawing Sheets

FOREIGN PATENT DOCUMENTS

| | | | |
|---|---|---|---|
| JP | 2000224650 | A | 8/2000 |
| JP | 2003333661 | A | 11/2003 |
| JP | 2005012806 | A | 1/2005 |
| JP | 2006191592 | A | 7/2006 |
| JP | 2009520435 | A | 5/2009 |
| JP | 2009544240 | | 12/2009 |
| WO | WO2007073040 | A1 | 6/2007 |
| WO | WO2008008412 | | 1/2008 |
| WO | WO2008008920 | | 1/2008 |

OTHER PUBLICATIONS

3GPP TSG RAN WG2 #61bis, Tdoc R2-081502, "Back-off operation for enhanced uplink in CELL_FACH", Ericsson, pp. 1-2, Shenzhen, China Mar. 31-Apr. 8, 2008.

3GPP TSG-RAN WG2 #61bis, R2-081829, "Load Management on E-DCH resource Release", LG Electronics Inc., pp. 1-4, Shenzhen, China, Mar. 31-Apr. 4, 2008.

Taiwan Search Report—TW098110722—TIPO—Aug. 17, 2012.

\* cited by examiner

METHODS AND APPARATUS FOR DYNAMIC LOAD BALANCING WITH E-AICH

CROSS-REFERENCE TO RELATED APPLICATIONS

This application claims the benefit of U.S. Provisional Patent application Ser. No. 61/041,059 entitled "DYNAMIC UPLINK LOAD BALANCING USING E-AICH" which was filed Mar. 31, 2008. The entirety of the aforementioned application is herein incorporated by reference.

BACKGROUND

I. Field

The following description relates generally to wireless communications, and more particularly to dynamic load balancing utilizing acquisition indicators.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, ... ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP2, 3GPP long-term evolution (LTE), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

Wireless communication systems oftentimes employ one or more base stations that provide a coverage area. A typical base station can transmit multiple data streams for broadcast, multicast and/or unicast services, wherein a data stream may be a stream of data that can be of independent reception interest to an access terminal. An access terminal within the coverage area of such base station can be employed to receive one, more than one, or all the data streams carried by the composite stream. Likewise, an access terminal can transmit data to the base station or another access terminal.

MIMO systems commonly employ multiple ($N_T$) transmit antennas and multiple ($N_R$) receive antennas for data transmission. A MIMO channel formed by the $N_T$ transmit and $N_R$ receive antennas may be decomposed into $N_S$ independent channels, which may be referred to as spatial channels, where $N_S \leq \{N_T, N_R\}$. Each of the $N_S$ independent channels corresponds to a dimension. Moreover, MIMO systems may provide improved performance (e.g., increased spectral efficiency, higher throughput and/or greater reliability) if the additional dimensionalities created by the multiple transmit and receive antennas are utilized.

In wireless communications, user equipments can select frequencies or carriers to utilize based upon a cell selection mechanism. The selection mechanism can result in multiple user equipments employing a single frequency. Accordingly, user equipments can overload a particular frequency while another frequency remains relatively underutilized.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with dynamic load balancing in wireless networks. In particular, a base station (e.g., eNodeB, NodeB, access point, etc.) can detect a load imbalance on uplink frequencies based at least in part on random access preambles signaled by mobile devices. The base station can transmit indicators to at least a subset of the mobile devices wherein the indicators include commands to switch uplink frequencies. Mobile devices can transition frequencies in response to the commands.

According to related aspects, a method that facilitates dynamic load balancing in a communications system is provided. The method can comprise determining whether a load imbalance exists based at least in part on random access preambles transmitted by one or more mobile devices. In addition, the method can also include signaling an indicator on an acquisition indicator channel to at least a subset of the one or more mobile devices, the indicator includes a command that orders a transition to a new frequency different than a frequency employed by the subset to transmit the random access preambles.

Another aspect relates to an apparatus that facilitates dynamic load balancing on uplink frequencies in a communications system. The apparatus can include a load evaluator that determines uplink frequency load based at least in part on signaling from one or more mobile devices. The apparatus can include a balancing module that ascertains a solution to a load imbalance if indicated by the load evaluator. In addition, the apparatus can comprise an AICH module that signals an indicator to at least one mobile device, the indicator includes a command that orders the at least one mobile device to transition to a new uplink frequency.

Yet another aspect relates to an apparatus that facilitates dynamic load balancing. The apparatus can comprise a random access module that transmits random access preambles on a first uplink frequency. The apparatus can also include an AICH evaluator that determines if an indicator received on an acquisition indicator channel includes a command to transition frequencies. In addition, the apparatus can comprise a frequency selector that switches uplink frequencies to a second frequency in response to the command.

Still another aspect relates to a method that facilitates dynamically resolving load imbalances in a communications system. The method can comprise sending a random access preamble on a first uplink frequency. The method can also include receiving an indicator on an acquisition indicator channel; the indicator includes a command to transition to a different uplink frequency. In addition, the method can comprise switching to a second uplink frequency in response to the indicator.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
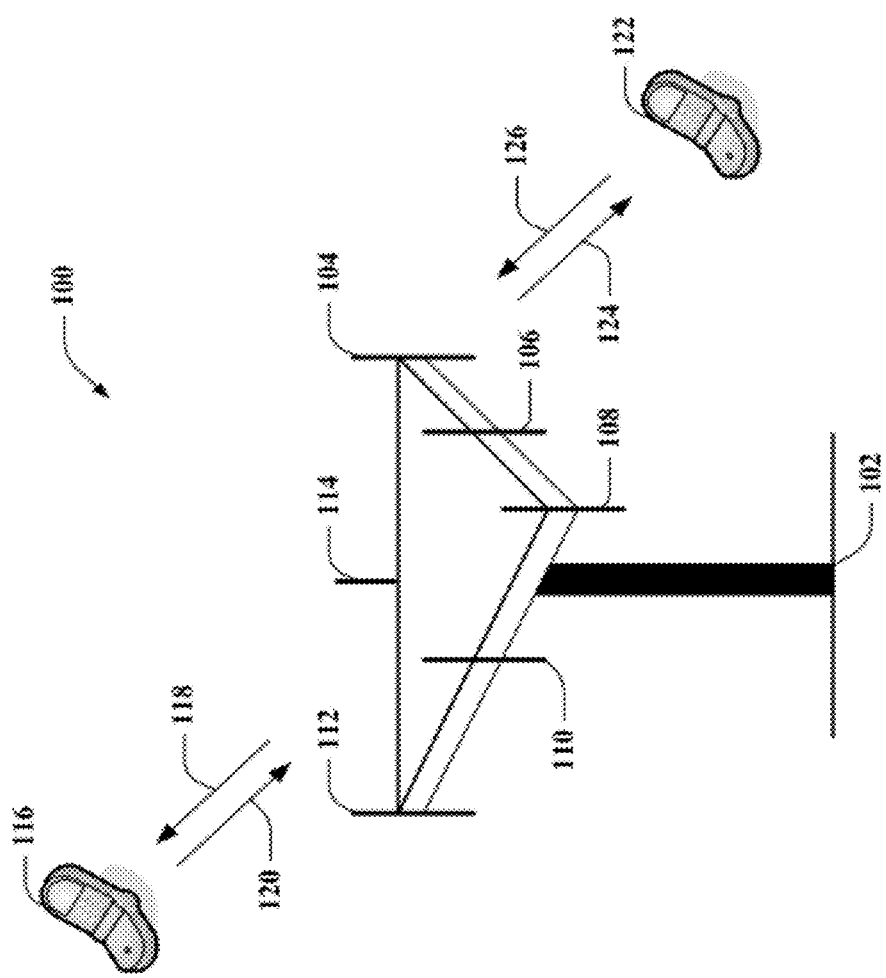
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, evolved Node B (eNode B or eNB), base transceiver station (BTS) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

The techniques described herein may be used for various wireless communication systems such as code division multiple access (CDMA), time division multiple access (TDMA), frequency division multiple access (FDMA), orthogonal frequency division multiple access (OFDMA), single carrier frequency domain multiplexing (SC-FDMA) and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project"

(3GPP). CDMA2000 and UMB are described in documents from an organization named "3rd Generation Partnership Project 2" (3GPP2).

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. This can be provided by using a precoder to steer signals in desired directions, for example. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices. Moreover, mobile devices 116 and 122 can communicate directly with one another using a peer-to-peer or ad hoc technology in one example. According to an example, system 100 can be a multiple-input multiple-output (MIMO) communication system. Further, system 100 can utilize substantially any type of duplexing technique to divide communication channels (e.g., forward link, reverse link, . . . ) such as FDD, TDD, and the like.

Figure 2:
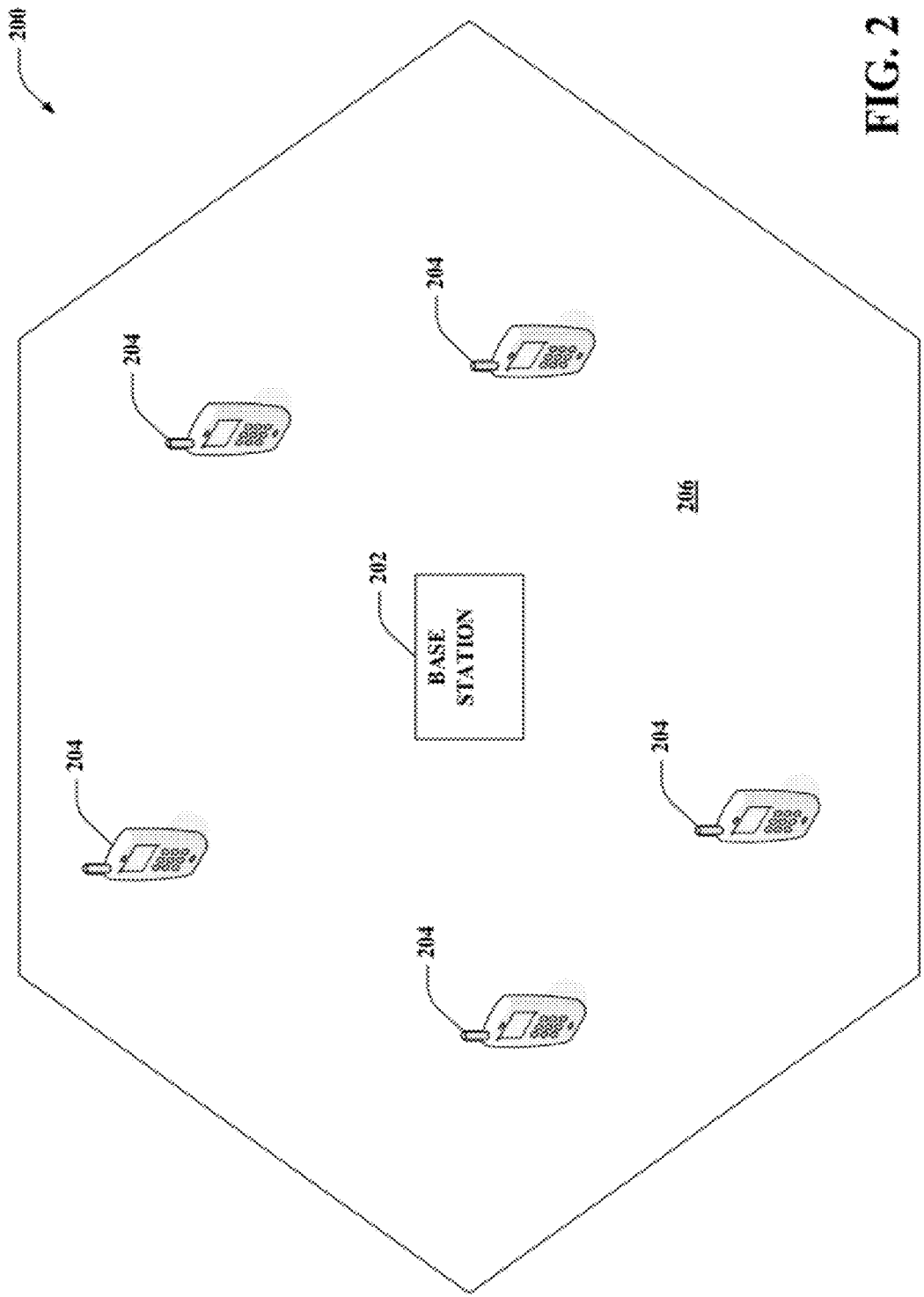
FIG. 2 is an illustration of an example wireless communication system that includes an example sector with a plurality of mobile devices.

Turning to FIG. 2, an example wireless communications system 200 is illustrated according to one or more aspects of the subject disclosure. The system 200 can comprise an access point or base station 202 that receives, transmits, repeats, etc., wireless communication signals to other base stations (not shown) or to one or more terminals such as terminals 206. The base station 202 can comprise multiple transmitter chains and receiver chains, e.g., one for each transmit and receive antenna, each of which can in turn comprise a plurality of components associated with signal transmission and reception (e.g., processors, modulators, multiplexers, demodulators, demultiplexers, antennas, etc.). The mobile devices 206 can be, for example, cellular phones, smart phones, laptops, handheld communication devices, handheld computing devices, satellite radios, global positioning systems, PDAs, and/or any other suitable device for communicating over wireless system 200. In addition, the mobile devices 206 can comprise one or more transmitter chains and a receiver chains, such as used for a multiple input multiple output (MIMO) system. Each transmitter and receiver chain can comprise a plurality of components associated with signal transmission and reception (e.g., processors, modulators, multiplexers, demodulators, demultiplexers, antennas, etc.), as will be appreciated by one skilled in the art.

As illustrated in FIG. 2, the base station 202 provides communication coverage for a particular geographic area or cell 204. The term "cell" can refer to a base station and/or its coverage area, depending on context. To improve system capacity, an access point coverage area can be partitioned into multiple smaller areas. Each smaller area is served by a respective base transceiver subsystem (BTS). The term "sector" can refer to a BTS and/or its coverage area depending upon context. For a sectorized cell, the base transceiver subsystem for all sectors of the cell is typically co-located within the access point for the cell.

According to an example, a mobile device, such as mobile devices 206, can detect the cell or sector that covers the geographic area 204 served by the base station 202. The mobile device acquires timing and synchronization of the base station 202 via a synchronization channel (SCH). Subsequently, the mobile device can access and demodulate a broadcast channel (BCH) to acquire system information. Pursuant to an illustration, system information can include a set of parameters that define how the mobile devices should access and interact with the system 200. The mobile device can transmit an access probe on a random access channel (RACH). Pursuant to an illustration, the access probe can include a random access preamble. The base station 202 can transmit an access grant message to the mobile device on a downlink or forward link channel after successfully detecting the access probe. For example, the base station 202 can transmit an acquisition indicator on an acquisition indicator channel (AICH) that informs mobile devices 206 that access is granted. In addition, the base station 202 can employ the access probes and/or random access preambles to determine a load distribution of mobile devices 206. For instance, the mobile device 206 can be heavily utilizing a particular frequency while another frequency is relatively underutilized. The base station 202 can signal a specific AICH value and subsequently employ a reserved value on an enhanced AICH (E-AICH) to command one or more mobile devices 206 to switch to another frequency.

The techniques described herein may be used for a system 200 with sectorized cells as well as a system with un-sectorized cells. For clarity, the following description is for a system with sectorized cells. The terms "access point" and "base station" is used generically for a fixed station that serves a sector as well as a fixed station that serves a cell. The terms "terminal," "user" and "user equipment" are used interchangeably, and the terms "sector," "access point" and "base station" are also used interchangeably. A serving access point/sector is an access point/sector with which a terminal communicates. A neighbor access point/sector is an access point/sector with which a terminal is not in communication.

Figure 3:
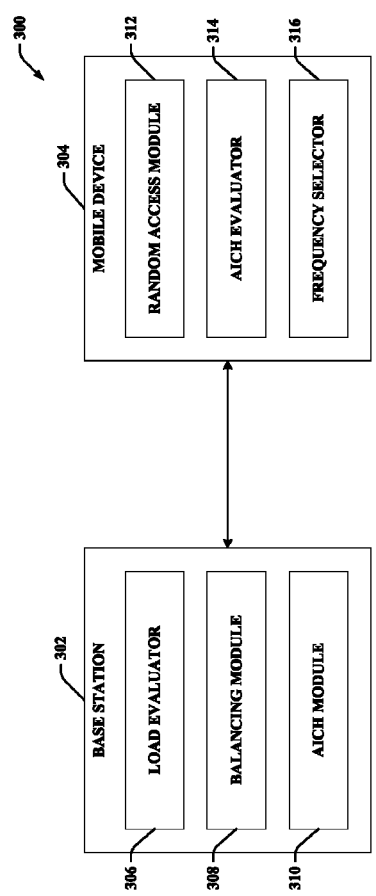
FIG. 3 is an illustration of an example wireless communications system that facilitates dynamic load balancing that utilizes E-AICH.

Now referring to FIG. 3, illustrated is a wireless communications system 300 that can facilitate dynamic load balancing that utilizes signaling on an enhanced acquisition indicator channel (E-AICH). The system 300 includes a base station 302 that can communicate with a mobile device 304 (and/or any number of disparate devices (not shown)). The base station 302 can transmit information to the mobile device 304 over a forward link or downlink channel; further base station 302 can receive information from the mobile device 304 over a reverse link or uplink channel. Moreover, system 300 can be a MIMO system or a multiple bearer system where the mobile device 304 serves multiple radio bearers (e.g. logical channels). Additionally, the system 300 can operate in an OFDMA wireless network (such as 3GPP, 3GPP2, 3GPP LTE, etc., for example). Also, the components and functionalities shown and described below in the base station 302 can be present in the mobile devices 304 and vice versa, in one example.

The base station 302 can include a load evaluator 306 that determines uplink frequency load based at least in part on mobile device signaling. The base station 302 can also include a balancing module 308 that determines a solution to a load imbalance. In addition, the base station 302 includes an AICH module 310 that implements the solution developed by the balancing module 308. The mobile device 304 can include a random access module 312 that signals random access preambles and/or access probes utilizing a particular uplink frequency. Moreover, the mobile device 304 can also include an AICH evaluator 314 that analyzes an AICH signal from base station 302 to determine if a transition command is indicated. In addition, the mobile device 304 can include a frequency selector 316 that can transition an uplink frequency employed by the mobile device 304.

According to an example, downlink and uplink frequencies can be paired together in frequency division duplex (FDD) systems. A particular downlink frequency, f1, is paired with a particular uplink frequency, f1', for instance. In certain radio resource control (RRC) states (e.g., CELL_PCH, CELL_FACH, etc.), user equipment or mobile devices can select a particular carrier in accordance with a cell reselection mechanism configured by a network (e.g., UMTS Terrestrial Radio Access Network (UTRAN)). Accordingly, situations can arise where multiple mobile devices or UEs camp (e.g., remain connected) on a particular frequency f1 relative to another frequency f2. The multiply connected mobile devices on frequency f1 can result in uplink frequency f1' (e.g., paired with downlink frequency f1) becoming more loaded than other uplink frequencies. In addition, in certain RRC connection mode states (e.g., CELL_DCH), data traffic is unpredictable and situations can arise where there is high demand for enhanced dedicated channel (E-DCH) usage that leads to high loading on a particular carrier. Accordingly, uplink load imbalance can result from sudden demand in E-DCH traffic on the uplink and/or due to a lack of available common E-DCH resources in a base station (e.g., imbalance in number of users camped on a pair of carriers in CELL_PCH and/or CELL_FACH states). In addition, load imbalance can also result due to processing load as well as over-the-air load. For instance, the base station 302 can have insufficient processing capacity to serve the mobile device 304 on a particular frequency. Accordingly, the base station 302 can require the mobile device 304 to transmit on a different uplink frequency when the mobile device 304 initiates random access.

The system 300 can solve load imbalance dynamically by enabling the base station 302 to command mobile devices to transition to other frequencies. Pursuant to an illustrative embodiment, the mobile device 304 can be connected to the base station 302 on a particular downlink frequency (e.g., downlink frequency f1). The random access module 312 of mobile device 304 can transmit a random access preamble and/or access probe to the base station 302 on an uplink frequency f1' (e.g., uplink frequency paired with downlink frequency f1). It is to be appreciated that the base station 302 can receive random access preambles from other mobile devices connected to it (not shown). The load evaluator 306 can determine load on a particular frequency based at least in part on the random access preambles received on that frequency. For example, the base station 302 can receive preambles from a dozen mobile devices on frequency f1' and receive preambles for one or two mobile devices on another frequency. From this the load evaluator 306 can ascertain that frequency f1' is heavily loaded relative to the other frequency. Accordingly, the load evaluator 306, in one aspect, can determine load on a frequency through an analysis of number of users on a particular frequency relative to another frequency. In addition, the load evaluator 306 can evaluate a load on a frequency in relation to a total number of users connected to the base station 302.

In response to a load imbalance, the balancing module 308 can develop a balancing solution. For example, the balancing module 308 can determine which mobile devices from a plurality of mobile devices loading a frequency should transition. Moreover, the balancing module 308 can instruct the base station 302 to deny new connection requests and command those users to another frequency. It to be appreciated that any balancing scheme can be developed by the balancing module 308 as long as it can be implemented with AICH/E-AICH combination signaling. The AICH module 310, in response to a random access preamble, can instruct a mobile device (e.g., mobile device 304) to switch frequencies to alleviate the imbalance. Pursuant to an example, the AICH module 310 can signal an AICH value of −1, which indicates a negative acknowledgment of the access probe or random access preamble. In addition, the AICH module 310 can transmit an E-AICH value that is reserved to indicate to the mobile device 304 to transition to another uplink frequency. The AICH evaluator 314 of the mobile device 304 can analyze the AICH/E-AICH signaling to determine if a frequency switch command issued. For example, the AICH evaluator 314 can ascertain the negative acknowledgment AICH value and the reserved E-AICH value. In accordance with one aspect, the frequency selector 316 can transition the mobile device 304 to another uplink frequency f2'. In accordance with one aspect, the uplink frequency f2' can be preconfigured in the mobile device 304. It is to be appreciated that frequencies f1, f1', f2 and f2' are described for illustrative purposes and that additional frequencies can be employed and/or preconfigured. For instance, the mobile device 304 can have more than two frequencies to which to transition to alleviate imbalance. The AICH module 310 can include a reserved value in the E-AICH signaling that indicates the frequency to be employed by the mobile device 304.

In one aspect, the mobile device 304 can remain connected on a downlink frequency (e.g., frequency f1) and not switch downlink frequencies when switching the uplink frequency. By not switching the downlink frequency as well as the uplink frequency, operations by the radio network controller (RNC) can be avoided. However, it is to be appreciated that the downlink and uplink frequencies can both switch in order to maintain frequency pairing between the downlink and uplink. After switching frequencies, the mobile device 304 can initiate random access procedures on the new uplink frequency (e.g., uplink frequency f2').

If the mobile device 304 is capable to remain on a downlink frequency when transitioning uplink frequencies, the base station 302 can have difficulty distinguishing between a case where the mobile device 304 listens on one downlink frequency (e.g., frequency f1) but transmits on a different, not paired uplink frequency (e.g., frequency f2') and a case where the mobile device 302 transitions both downlink and uplink frequencies (e.g., listens and transmits on paired frequencies f2 and f2'). The base station 302 needs to distinguish such cases in order to communicate AICH/E-AICH signaling to the mobile device 304 on the proper frequency when the mobile device 304 initiates random access procedures on the new uplink frequency.

In one aspect, the mobile device 304 can also retune downlink frequencies whenever uplink frequency is changed due to imbalance. The frequency selector 316 can change downlink frequencies to a frequency paired with the uplink frequency transitioned to in response to a frequency switch command from the base station 302. The reconfiguration can take around one millisecond. The mobile device 304 can perform a cell update procedure to notify the UMTS terrestrial radio access network (UTRAN) that it has switched frequencies.

In accordance with another aspect, the mobile device 304 can continue to listen to the downlink frequency utilized prior to any uplink frequency transition. A random access preamble transmitted by the mobile device 304 during random access procedures can be sub-partitioned to include a field that indicates to the base station 302 the downlink frequency monitored by the mobile device 304. To avoid increased collision probability, the preamble can require significant partitioning to accommodate all available downlink/uplink frequency pairings (e.g., N pairs where N is any integer greater than or equal to 2). It is to be appreciated that the mobile device 304 can be dual-cell high speed downlink packet access (DC-HSDPA) capable or some other multi-carrier device that can listen on at least two downlink frequencies. The base station 302 need not worry about DC-HSDPA or multi-carrier capable mobile devices.

Moreover, although not shown, it is to be appreciated that the base station 302 can include memory that retains instructions with respect to evaluating load, developing balancing solutions, signaling transition commands, and the like. In addition, the mobile device 304 can also include a memory that retains instructions related to implementing random access procedures (e.g., sending random access preambles), identifying frequency transition commands, transition frequencies, etc. Further, the base station 302 and the mobile device 304 can include processors that can be utilized in connection with executing instructions (e.g., instructions retained within memory, instructions obtained from a disparate source, . . . ).

Figure 4:
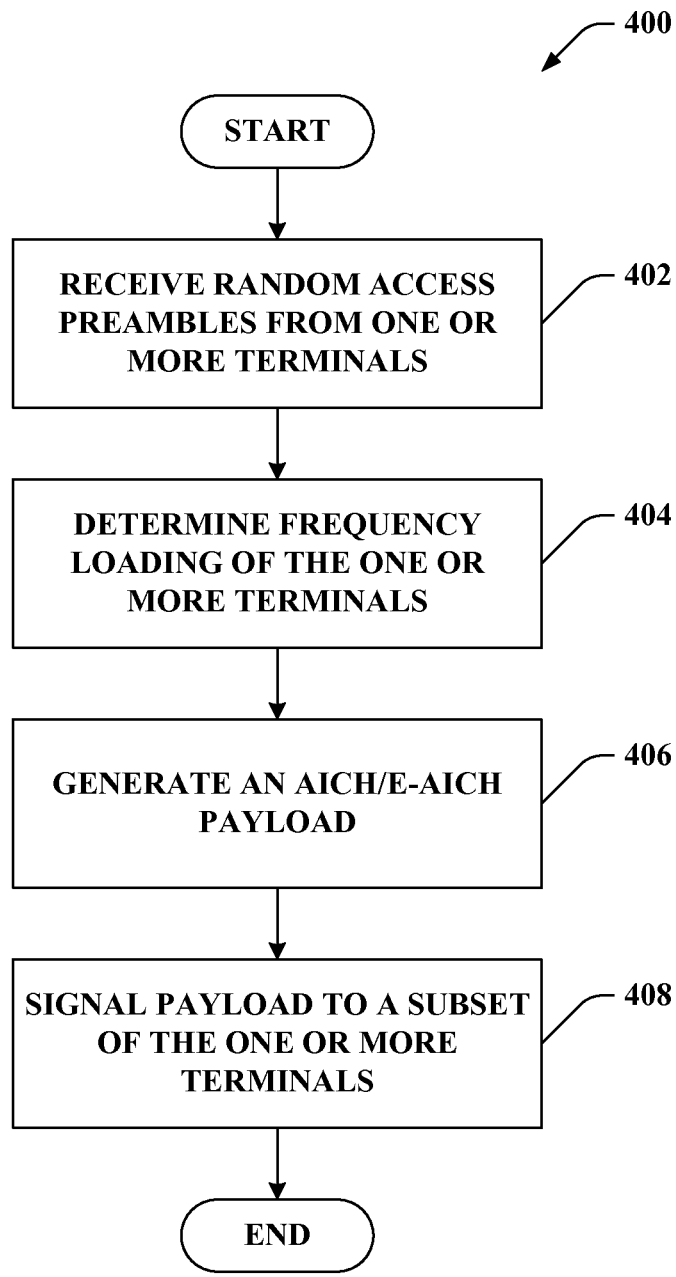
FIG. 4 is an illustration of an example methodology that facilitates balancing frequency load of mobile devices.
Figure 5:
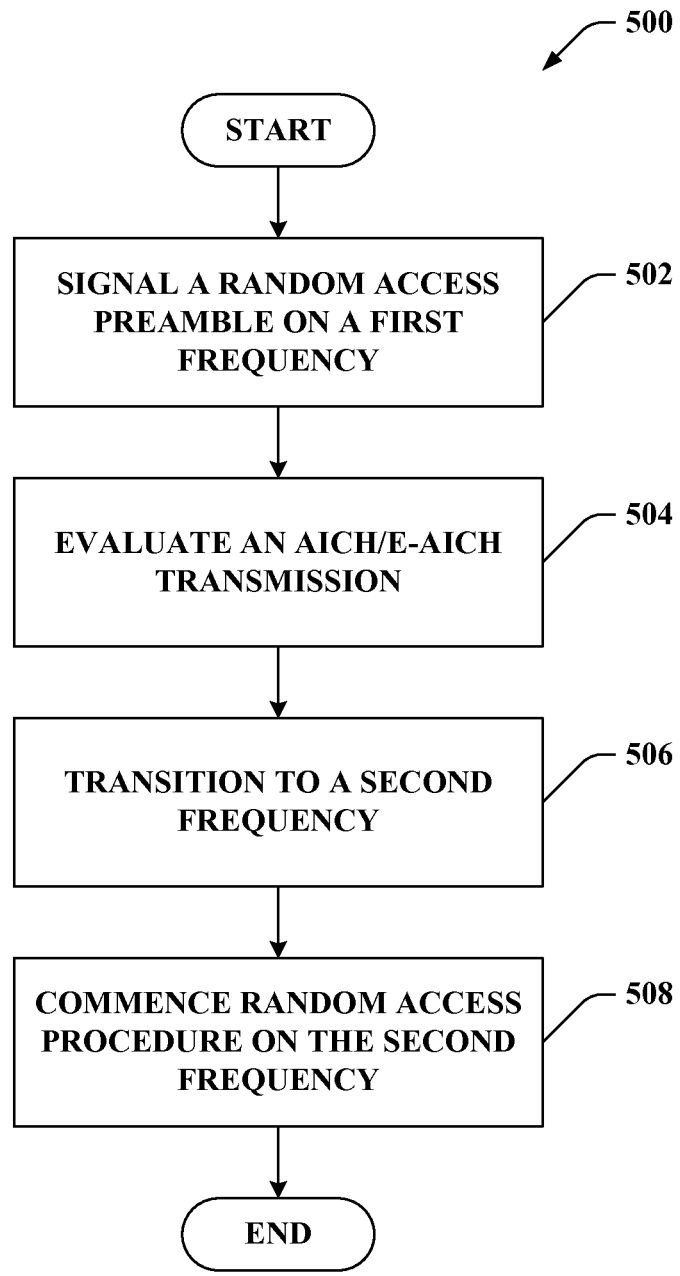
FIG. 5 is an illustration of an example methodology that facilitates switching frequencies in a loaded scenario.

Referring to FIGS. 4-5, methodologies relating to dynamic load balancing utilizing AICH/E-AICH signaling are described. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 4, illustrated is a methodology 400 that facilitates dynamically balancing frequency load due to connected mobile devices in a wireless communications system. The method 400 can be implemented by a base station (e.g., NodeB, evolved NodeB, access point, etc.), for example. At reference numeral 402, random access preambles from one or more access terminals (e.g., user equipment (UE), mobile devices, handsets, . . . ) are received. The random access preambles can be received on an uplink frequency corresponding to a downlink frequency to which the one or more terminals are connected. At reference numeral 404, frequency loading of the one or more terminals is determined. For example, the one or more terminals can be camped on a particular downlink frequency and, accordingly, can result in high demand for corresponding uplink frequency. Thus, the relative loading of the one or more terminals is ascertained. Pursuant to an illustration, the frequency loads can be determined in accordance with the frequencies employed to send the random access preambles received. For instance, number of preambles received on a particular frequency corresponds to the load of that frequency. At reference numeral 406, an AICH/E-AICH payload is generated. In accordance with an aspect, the payload can be generated based upon a balancing scheme. Pursuant to an illustration, the payload can be generated to command a subset of terminals to transition to an under loaded frequency to correct a load imbalance on a heavily utilized frequency. The AICH/E-AICH payload can include an AICH value that indicates a negative acknowledgement (e.g, −1) and a reserved E-AICH value that indicates a command to transition frequencies. At reference numeral 408, the payload is signaled to at least a subset of the one or more terminals that transmitted random access preambles. The subset of terminals can then transition frequencies to provide balanced frequency load in a wireless communications system.

Turning to FIG. 5, illustrated is a methodology 500 that facilitates switching frequencies in a loaded scenario in wireless communication systems. In accordance with an aspect, the method 500 can be employed by a mobile device. At reference numeral 502, a random access preamble can be signaled on a first frequency. For example, the first frequency can be an uplink frequency that corresponds to a downlink frequency employed in a connection. At reference numeral 504, an AICH/E-AICH transmission is evaluated. For instance, an AICH value can indicate a negative acknowledgment of the random access preamble and/or indicate that a command is included in an E-AICH signal. A reserved E-AICH value can accompany the AICH value to indicate a command to transition uplink frequencies. At reference numeral 506, a transition to a second frequency occurs. In one example, the second frequency can be pre-configured. Moreover, the downlink frequency can remain unchanged to avoid operations by a network controller. At reference numeral 508, random access procedures commence on the second frequency.

It will be appreciated that, in accordance with one or more aspects described herein, inferences can be made regarding determining frequency load balances, developing balancing solutions, transitioning frequencies, and the like. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 6:
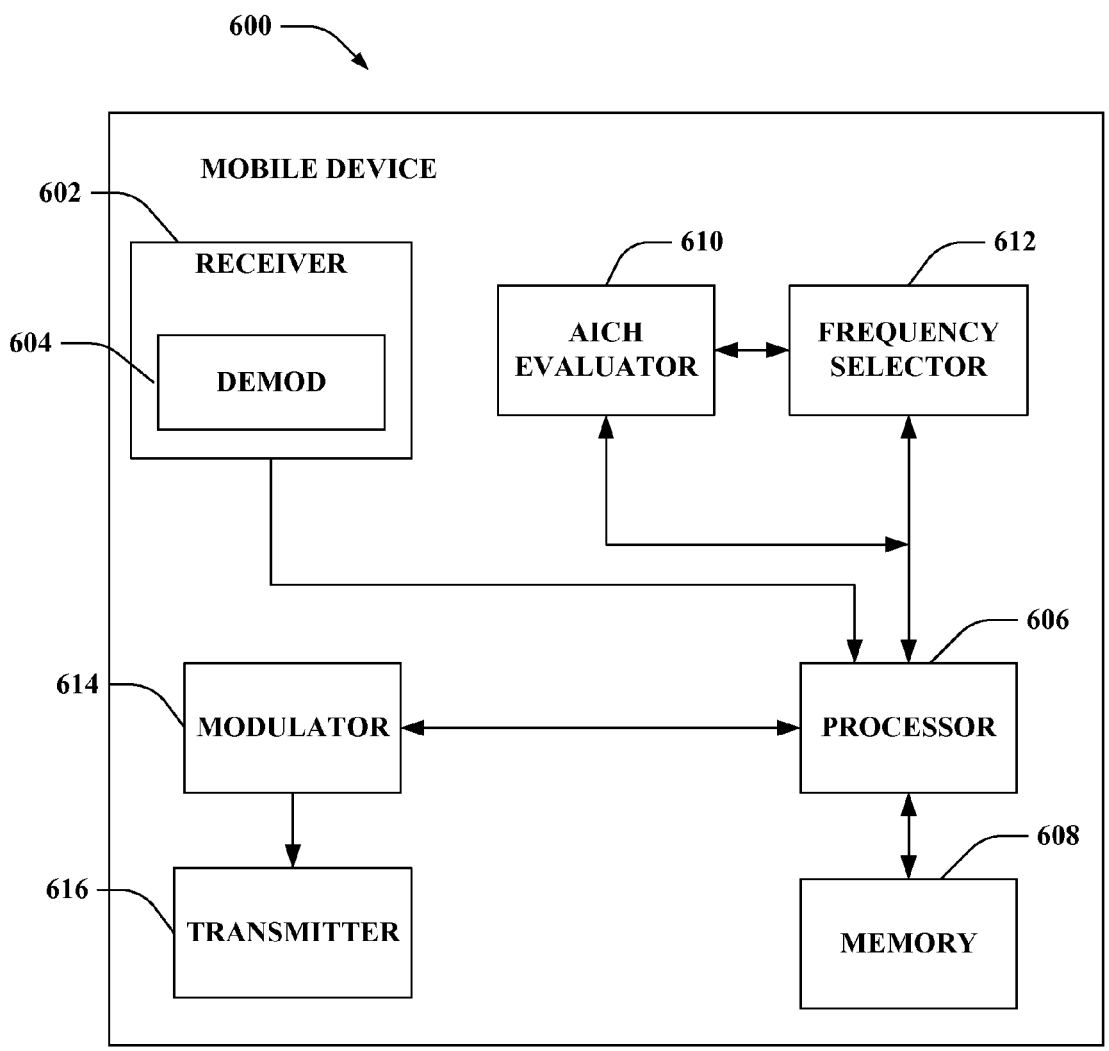
FIG. 6 is an illustration of an example system that facilitates switching uplink frequencies in a loaded frequency situation.

FIG. 6 is an illustration of a mobile device 600 that facilitates employing uplink requests in accordance with an aspect of the subject disclosure. The mobile device 600 can facilitate communications associated with a mobile device in a wireless communication system in accordance with an aspect of the disclosed subject matter. It is to be appreciated that the mobile device 600 can be the same or similar as, and/or can comprise the same or similar functionality as, mobile device 116, 122, 204, and/or 304 as more described, for example, with regard to system 100, system 200, system 300, methodology 400, and methodology 500.

Mobile device 600 comprises a receiver 602 that receives a signal from, for instance, a receive antenna (not shown), performs typical actions on (e.g., filters, amplifies, downconverts, etc.) the received signal, and digitizes the conditioned signal to obtain samples. Receiver 602 can be, for example, an MMSE receiver, and can comprise a demodulator 604 that can demodulate received symbols and provide them to a processor 606 for channel estimation. Processor 606 can be a processor dedicated to analyzing information received by receiver 602 and/or generating information for transmission by a transmitter 616, a processor that controls one or more components of mobile device 600, and/or a processor that both analyzes information received by receiver 602, generates information for transmission by transmitter 616, and controls one or more components of mobile device 600. Mobile device 600 can also comprise a modulator 614 that can work in conjunction with the transmitter 616 to facilitate transmitting signals (e.g., data) to, for instance, a base station (e.g., 102, 202, 302), another mobile device (e.g., 122), etc.

Mobile device 600 can additionally comprise memory 608 that is operatively coupled to processor 606 and that can store data to be transmitted, received data, information related to available channels, data associated with analyzed signal and/or interference strength, information related to an assigned channel, power, rate, or the like, and any other suitable information for estimating a channel and communicating via the channel. Memory 608 can additionally store protocols and/or algorithms associated with estimating and/or utilizing a channel (e.g., performance based, capacity based, etc.). Further, memory 608 can retain prioritized bit rates, maximum bit rates, queue sizes, etc., related to one or more bearers serviced by the mobile device 600.

It will be appreciated that the data store (e.g., memory 608) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 608 of the subject systems and methods is intended to comprise, without being limited to, these and any other suitable types of memory.

Processor 606 can be operatively coupled to an AICH evaluator 610 that that analyzes an AICH/E-AICH signal from a base station to determine if a transition command is indicated. The AICH/E-AICH signal can be in response to a random access preamble sent by the mobile device 600 on a particular uplink frequency. The AICH/E-AICH signal can include an AICH value that indicates a negative acknowledgment and a reserved E-AICH value that indicates a command to switch uplink frequencies due to a load imbalance. Processor 606 can further be coupled to a frequency selector 612 that transitions uplink frequencies in response to an AICH/E-AICH signal that includes a command to switch frequencies. In one example, the frequency transitioned to can be preconfigured on mobile device 600. The mobile device 600 can initiate random access procedures on the new uplink frequency after a transition. Mobile device 600 still further comprises a modulator 614 and transmitter 616 that respectively modulate and transmit signals to, for instance, a base station, another mobile device, etc. Although depicted as being separate from the processor 606, it is to be appreciated that the AICH evaluator 610, frequency selector 612, demodulator 604, and/or modulator 614 can be part of the processor 606 or multiple processors (not shown).

Figure 7:
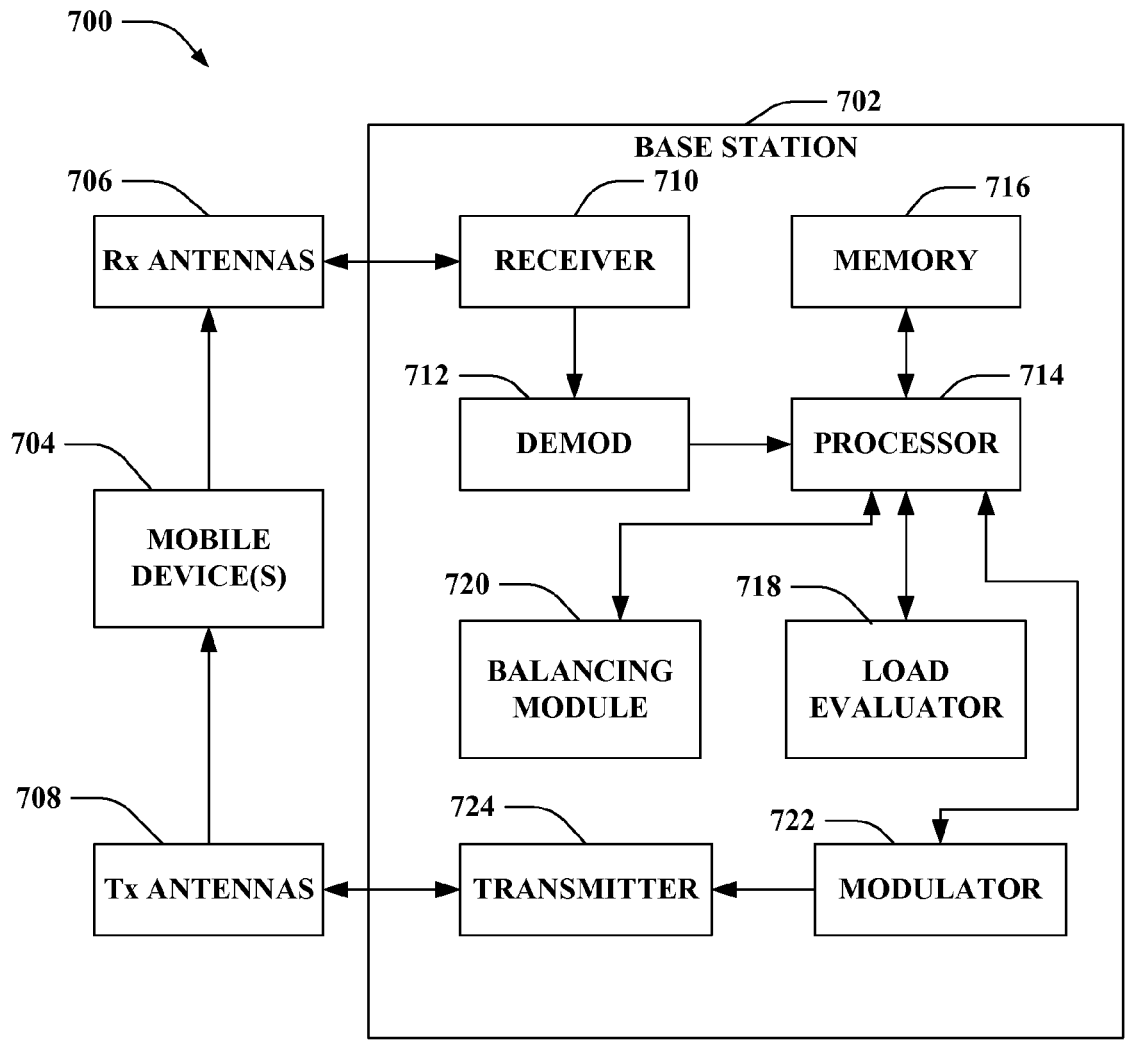
FIG. 7 is an illustration of an example system that facilitates dynamically balancing uplink frequency load.

FIG. 7 is an illustration of a system 700 that can facilitate communications associated with a mobile device in a wireless communication system in accordance with an aspect of the disclosed subject matter. The system 700 comprises a base station 702 (e.g., access point, . . . ) with a receiver 710 that receives signal(s) from one or more mobile devices 704 through a plurality of receive antennas 706, and a transmitter 724 that transmits to the one or more mobile devices 704 through a transmit antenna 708. Receiver 710 can receive information from receive antennas 706 and is operatively associated with a demodulator 712 that demodulates received information. Demodulated symbols are analyzed by a processor 714 that can that can be a processor dedicated to analyzing information received by receiver 710, generating information for transmission by a transmitter 724, a processor that controls one or more components of base station 702, and/or a processor that concurrently analyzes information received by receiver 710, generates information for transmission by transmitter 724, and controls one or more components of base station 702. In addition, the processor 714 can be similar to the processor described above with regard to FIG. 6, and which is coupled to a memory 716 that stores information related to estimating a signal (e.g., pilot) strength and/or interference strength, data to be transmitted to or received from mobile device(s) 704 (or a disparate base station (not shown)), and/or any other suitable information related to performing the various actions and functions set forth herein.

In addition, the memory 716 can store data to be transmitted, received data, information related to available channels, data associated with analyzed signal and/or interference strength, information related to an assigned channel, power, rate, or the like, and any other suitable information for estimating a channel and communicating via the channel. Memory 716 can additionally store protocols and/or algorithms associated with estimating and/or utilizing a channel (e.g., performance based, capacity based, etc.). The base station 702 can also comprise a modulator 722 that can work in conjunction with the transmitter 724 to facilitate transmitting signals (e.g., data) to, for instance, mobile devices 704, another device, etc.

It will be appreciated that the memory 716 described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 708 of the subject systems and methods is intended to comprise, without being limited to, these and any other suitable types of memory.

Processor 714 is further coupled to a load evaluator 718. The load evaluator 718 can determine frequency load based at least in part on random access preambles sent by mobile devices 704. Moreover, processor 714 can be coupled to a balancing module 720 that develops a balancing solution to correct an uplink frequency imbalance, if determined by the load evaluator 718. Furthermore, although depicted as being separate from the processor 714, it is to be appreciated that the load evaluator 718, balancing module 720, demodulator 712, and/or modulator 722 can be part of the processor 714 or multiple processors (not shown).

Figure 8:
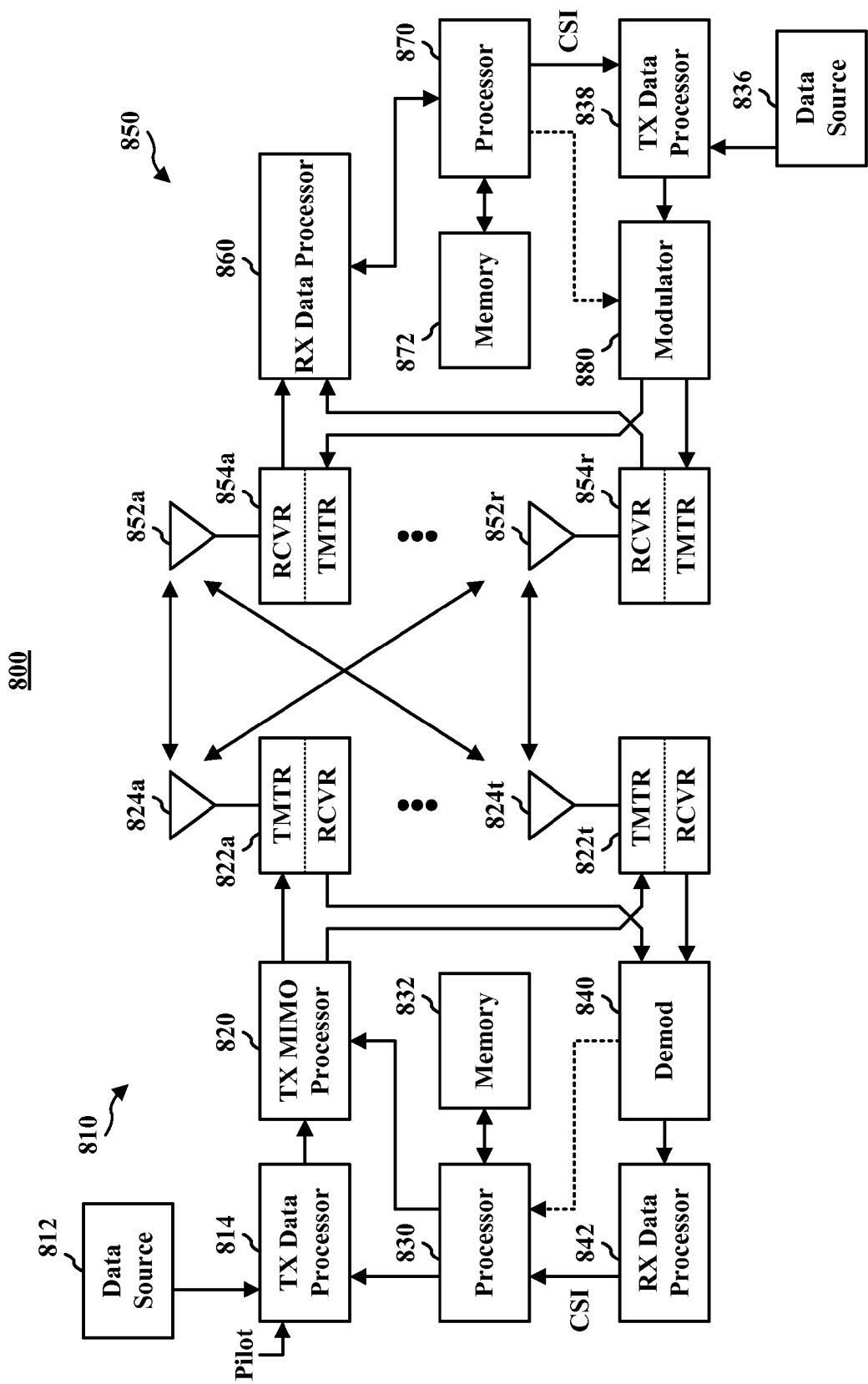
FIG. 8 is an illustration of an example wireless network environment that can be employed in conjunction with the various systems and methods described herein.

FIG. 8 shows an example wireless communication system 800. The wireless communication system 800 depicts one base station 810 and one mobile device 850 for sake of brevity. However, it is to be appreciated that system 800 can include more than one base station and/or more than one mobile device, wherein additional base stations and/or mobile devices can be substantially similar or different from example base station 810 and mobile device 850 described below. In addition, it is to be appreciated that base station 810 and/or mobile device 850 can employ the systems (FIGS. 1-3 and 6-7), and/or methods (FIGS. 4-7) described herein to facilitate wireless communication there between.

At base station 810, traffic data for a number of data streams is provided from a data source 812 to a transmit (TX) data processor 814. According to an example, each data stream can be transmitted over a respective antenna. TX data processor 814 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 850 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 830.

The modulation symbols for the data streams can be provided to a TX MIMO processor 820, which can further process the modulation symbols (e.g., for OFDM). TX MIMO processor 820 then provides $N_T$ modulation symbol streams to $N_T$ transmitters (TMTR) 822a through 822t. In various embodiments, TX MIMO processor 820 applies beamforming weights to the symbols of the data streams and to the antenna from which the symbol is being transmitted.

Each transmitter 822 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 822a through 822t are transmitted from $N_T$ antennas 824a through 824t, respectively.

At mobile device 850, the transmitted modulated signals are received by $N_R$ antennas 852a through 852r and the received signal from each antenna 852 is provided to a respective receiver (RCVR) 854a through 854r. Each receiver 854 conditions (e.g., filters, amplifies, and downconverts) a respective signal, digitizes the conditioned signal to provide samples, and further processes the samples to provide a corresponding "received" symbol stream.

An RX data processor 860 can receive and process the $N_R$ received symbol streams from $N_R$ receivers 854 based on a particular receiver processing technique to provide $N_T$ "detected" symbol streams. RX data processor 860 can demodulate, deinterleave, and decode each detected symbol stream to recover the traffic data for the data stream. The processing by RX data processor 860 is complementary to that performed by TX MIMO processor 820 and TX data processor 814 at base station 810.

A processor 870 can periodically determine which precoding matrix to utilize as discussed above. Further, processor 870 can formulate a reverse link message comprising a matrix index portion and a rank value portion.

The reverse link message can comprise various types of information regarding the communication link and/or the received data stream. The reverse link message can be processed by a TX data processor 838, which also receives traffic data for a number of data streams from a data source 836, modulated by a modulator 880, conditioned by transmitters 854a through 854r, and transmitted back to base station 810.

At base station 810, the modulated signals from mobile device 850 are received by antennas 824, conditioned by receivers 822, demodulated by a demodulator 840, and processed by a RX data processor 842 to extract the reverse link message transmitted by mobile device 850. Further, processor 830 can process the extracted message to determine which precoding matrix to use for determining the beamforming weights.

Processors 830 and 870 can direct (e.g., control, coordinate, manage, etc.) operation at base station 810 and mobile device 850, respectively. Respective processors 830 and 870 can be associated with memory 832 and 872 that store program codes and data. Processors 830 and 870 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 9:
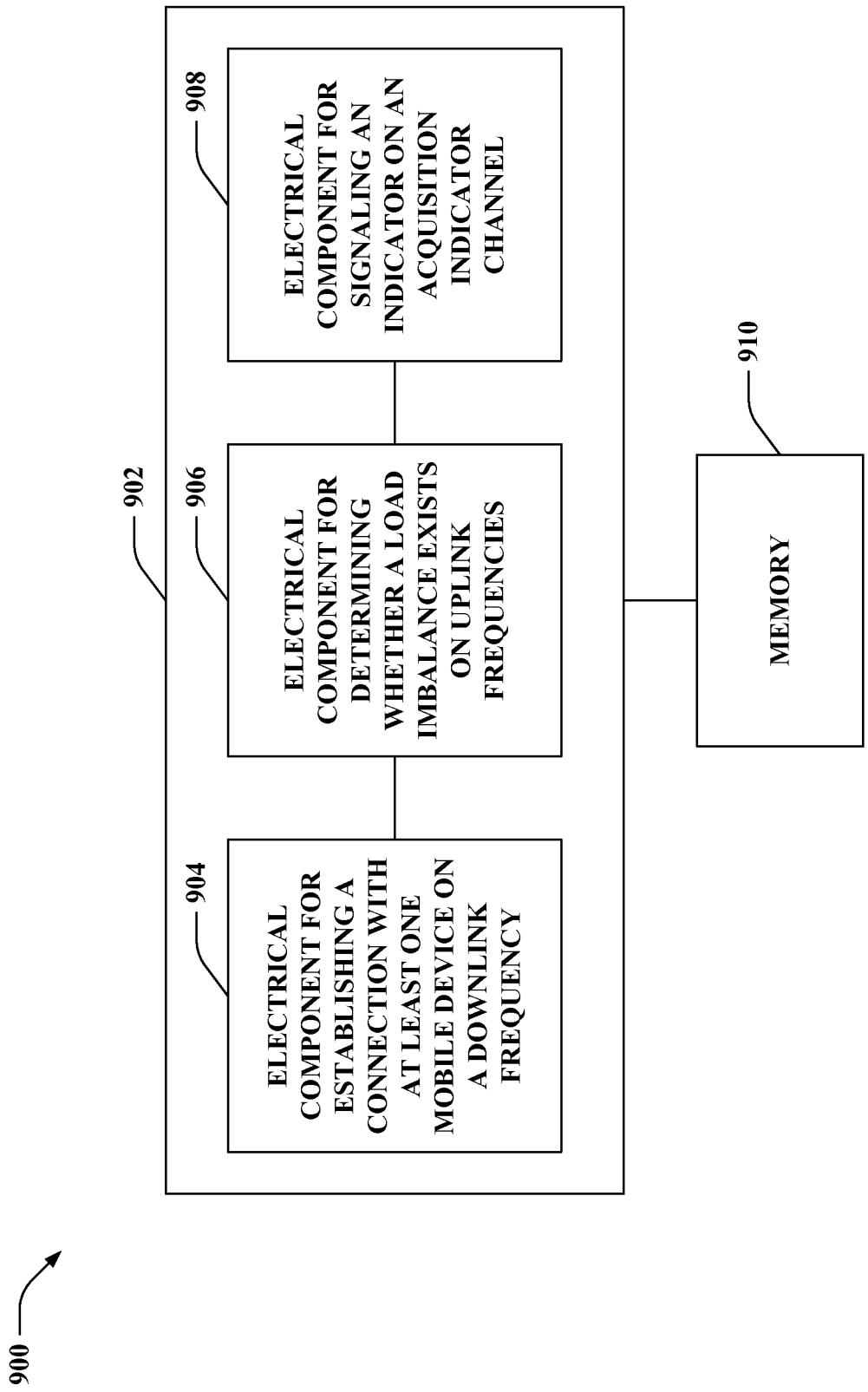
FIG. 9 is an illustration of an example system that that facilitates dynamic load balancing in wireless communications networks.

With reference to FIG. 9, illustrated is a system 900 that facilitates dynamic load balancing in wireless communications networks. For example, system 900 can reside at least partially within a base station, mobile device, etc. It is to be appreciated that system 900 is represented as including functional blocks, which can be functional blocks that represent functions implemented by a processor, software, or combination thereof (e.g., firmware). System 900 includes a logical grouping 902 of electrical components that can act in conjunction. For instance, logical grouping 902 can include an electrical component for establishing a connection with at least one mobile device on a downlink frequency 904. Further, logical grouping 902 can comprise an electrical component for determining whether a load imbalance exists on uplink frequencies 906. Moreover, logical grouping 902 can comprise an electrical component signaling an indicator on an acquisition indicator channel 908. Additionally, system 900 can include a memory 910 that retains instructions for executing functions associated with electrical components 904, 906, and 908. While shown as being external to memory 910, it is to be understood that one or more of electrical components 904, 906, and 908 can exist within memory 910.

Figure 10:
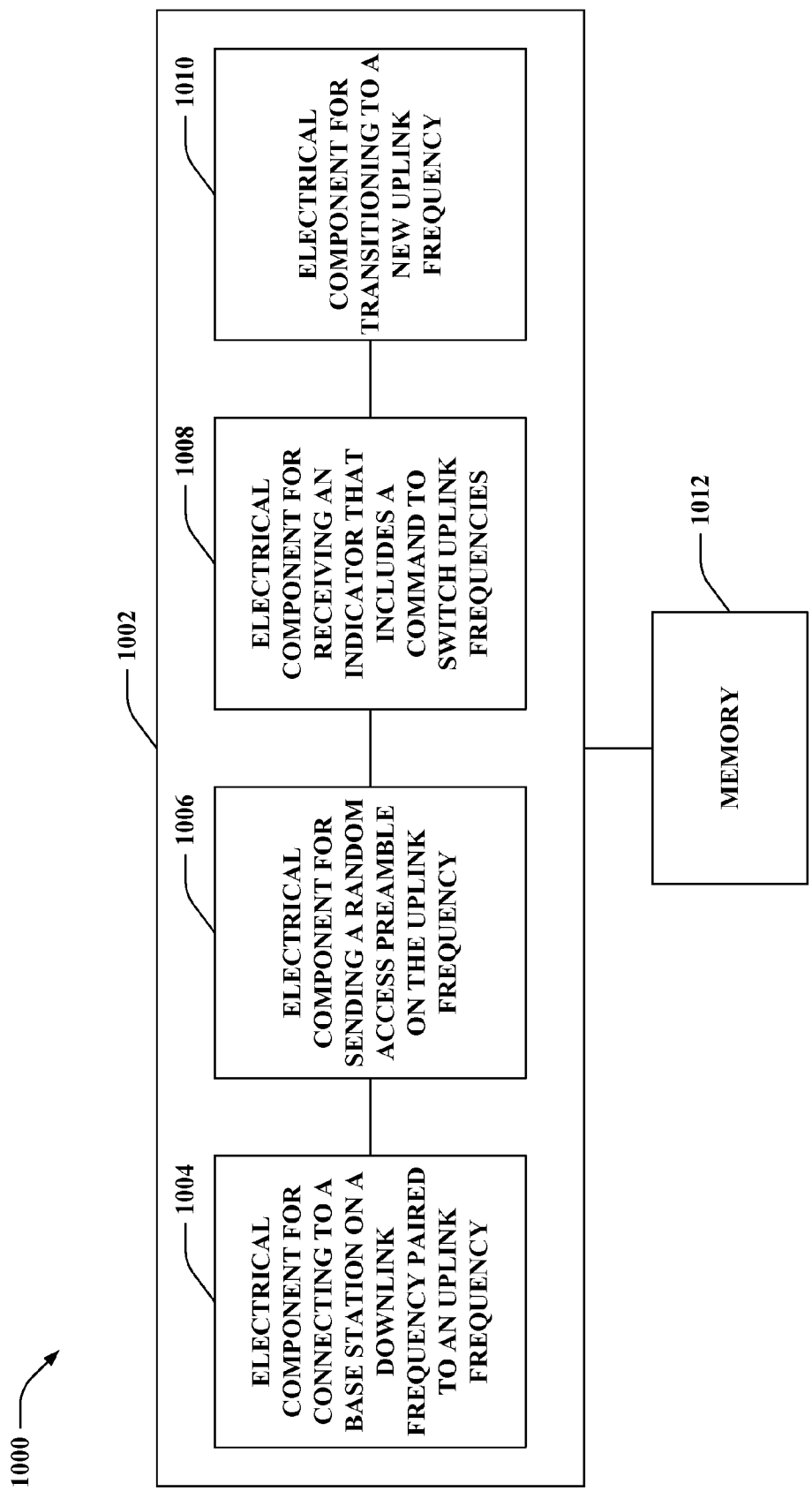
FIG. 10 is an illustration of an example system that facilitates dynamic load balancing through frequency transitions in response to commands.

Turning now to FIG. 10, illustrated is a system 1000 that facilitates dynamic load balancing in wireless communications networks. For example, system 1000 can reside at least partially within a base station, mobile device, etc. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for connecting to a base station on a downlink frequency paired to an uplink frequency 1004. Further, logical grouping 1002 can comprise an electrical component for sending a random access preamble on the uplink frequency 1006. Moreover, logical grouping 1002 can comprise an electrical component receiving an indicator that includes a command to switch uplink frequencies 1008. Further, logical grouping 1002 can include an electrical component for transitioning to a new uplink frequency 1010. Additionally, system 1000 can include a memory 1012 that retains instructions for executing functions associated with electrical components 1004, 1006, 1008 and 1010. While shown as being external to memory 1012, it is to be understood that one or more of electrical components 1004, 1006, 1008 and 1010 can exist within memory 1012.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates dynamic load balancing in a communications system, comprising:
    determining, at a base station, whether a load imbalance exists between a first frequency and a second frequency based at least in part on random access preambles transmitted by one or more mobile devices; and
    signaling an indicator on an acquisition indicator channel from the base station to at least a subset of the one or more mobile devices in response to determining the load imbalance, the indicator comprising (1) a command that orders a transition to a new frequency different than a frequency employed by the subset to transmit the random access preambles; and (2) a negative acknowledgement to the random access preambles.

2. The method of claim 1, establishing a connection with the one or more mobile devices on a downlink frequency.

3. The method of claim 2, wherein the downlink frequency is paired to the frequency employed to transmit the random access preambles.

4. The method of claim 2, wherein the new frequency is not paired to the downlink frequency.

5. The method of claim 1, determining the load imbalance comprises ascertaining whether a first frequency is more loaded relative to a second frequency.

6. The method of claim 1, wherein determining the load imbalance comprises determining a number of mobile stations camped on each of the first and second frequencies.

7. The method of claim 1, wherein determining the load imbalance comprises determining an amount of data traffic relative to available radio resources on each of the first and second frequencies.

8. The method of claim 1, wherein each of the random access preamble is configured to include a plurality of sub-partitions for accommodating existing downlink and uplink frequency pairings in the communication system.

9. The method of claim 1, wherein signaling the indicator on the acquisition indicator channel comprises:
    signaling the command in connection with a reserved value on an enhanced acquisition indicator channel (E-AICH); and
    signaling the negative acknowledgement in connection with a specific AICH value.

10. An apparatus that facilitates dynamic load balancing on uplink frequencies in a communications system, comprising:
    a load evaluator that determines, at a base station, uplink frequency load based at least in part on signaling from one or more mobile devices;
    a balancing module that ascertains a solution to a load imbalance if indicated by the load evaluator; and
    an AICH module that signals an indicator from the base station to at least one mobile device in response to the load imbalance, the indicator comprising (1) a command that orders the at least one mobile device to transition to a new uplink frequency; and (2) a negative acknowledgement to the random access preambles.

11. The apparatus of claim 10, wherein the signaling from the one or more mobile devices include a random access preamble.

12. The apparatus of claim 10, wherein the signaling from the one or more mobile devices is received on an uplink frequency paired to a downlink frequency connected to the one or more mobile devices.

13. The apparatus of claim 12, wherein the new uplink frequency is not paired to the downlink frequency.

14. The apparatus of claim 10, wherein the AICH module signals the indicator on at least one of an acquisition indicator channel or an enhanced acquisition indicator channel.

15. A non-transitory computer readable medium comprising instructions executable for:
    determining, at a base station, whether a load imbalance exists between a first frequency and a second frequency based at least in part on random access preambles transmitted by one or more mobile devices; and
    signaling an indicator on an acquisition indicator channel from the base station to at least a subset of the one or more mobile devices in response to determining the load imbalance, the indicator comprising (1) a command that orders a transition to a new frequency different than a frequency employed by the subset to transmit the random access preambles; and (2) a negative acknowledgement to the random access preambles.

16. A method that facilitates dynamically resolving load imbalances in a communications system, comprising:
    sending a random access preamble from a mobile station on a first uplink frequency to a base station;
    receiving, at the mobile station from the base station, an indicator on an acquisition indicator channel, the indicator comprising (1) a command to transition to a second, different uplink frequency, and (2) a negative acknowledgement to the random access preamble, wherein the indicator is in response to the base station determining a load imbalance between the first and second uplink frequencies based on the random access preamble; and
    switching to the second uplink frequency in response to the indicator.

17. The method of claim 16, further comprising connecting to a base station on a downlink frequency that is paired to the first uplink frequency.

18. The method of claim 17, wherein the second uplink frequency is not paired to the downlink frequency.

19. The method of claim 16, initiating random access procedures on the second frequency.

20. The method of claim 16, wherein the second frequency is pre-configured.

21. An apparatus that facilitates dynamic load balancing, comprising:
 a random access module that transmits random access preambles from a mobile station on a first uplink frequency to a base station;
 an AICH evaluator that determines if an indicator received on an acquisition indicator channel at the mobile station from the base station, the indicator comprising (1) a command to transition frequencies; and (2) a negative acknowledgement to the random access preambles, wherein the indicator is in response to the base station determining a load imbalance between the first uplink frequency and a second uplink frequency based on the random access preambles; and
 a frequency selector that switches uplink frequencies to the second frequency in response to the command.

22. The apparatus of claim 21, the random access module initiates random access procedures on the second frequency after a switch.

23. The apparatus of claim 21, wherein the first uplink frequency is paired to a downlink frequency employed by the apparatus to receive transmissions.

24. The apparatus of claim 21, wherein the second frequency is pre-configured.

25. The apparatus of claim 21, wherein the second frequency is not paired to a downlink frequency employed to receive transmissions.

26. An apparatus that facilitates dynamically resolving load imbalances in a communications system, comprising:
 means for sending a random access preamble from a mobile station on a first uplink frequency to a base station;
 means for receiving, at the mobile station from the base station, an indicator on an acquisition indicator channel, the indicator comprising (1) a command to transition to a second, different uplink frequency, and (2) a negative acknowledgement to the random access preamble, wherein the indicator is in response to the base station determining a load imbalance between the first and second uplink frequencies based on the random access preamble; and
 means for switching to the second uplink frequency in response to the indicator.

27. The apparatus of claim 26, further comprising means for connecting to a base station on a downlink frequency that is paired to the first uplink frequency.

28. The apparatus of claim 27, wherein the second uplink frequency is not paired to the downlink frequency.

29. The apparatus of claim 26, further comprising means for initiating random access procedures on the second frequency.

30. The apparatus of claim 26, wherein the second frequency is pre-configured.

31. An apparatus that facilitates dynamic load balancing in a communications system, comprising:
 means for determining, at a base station, whether a load imbalance exists between a first frequency and a second frequency based at least in part on random access preambles transmitted by one or more mobile devices; and
 means for signaling an indicator on an acquisition indicator channel from the base station to at least a subset of the one or more mobile devices in response to determining the load imbalance, the indicator comprising (1) a command that orders a transition to a new frequency different than a frequency employed by the subset to transmit the random access preambles; and (2) a negative acknowledgement to the random access preambles.

32. The apparatus of claim 31, further comprising means for establishing a connection with the one or more mobile devices on a downlink frequency.

33. The apparatus of claim 32, wherein the downlink frequency is paired to the frequency employed to transmit the random access preambles.

34. The apparatus of claim 32, wherein the new frequency is not paired to the downlink frequency.

35. The apparatus of claim 31, wherein the means for determining the load imbalance comprises means for ascertaining whether a first frequency is more loaded relative to a second frequency.

36. A non-transitory computer readable medium comprising instructions executable for:
 sending a random access preamble from a mobile station on a first uplink frequency to a base station;
 receiving, at the mobile station from the base station, an indicator on an acquisition indicator channel, the indicator comprising (1) a command to transition to a second, different uplink frequency, and (2) a negative acknowledgement to the random access preamble, wherein the indicator is in response to the base station determining a load imbalance between the first and second uplink frequencies based on the random access preamble; and
 switching to the second uplink frequency in response to the indicator.

* * * * *